United States Patent [19]

Hayashi et al.

[11] Patent Number: 5,777,064
[45] Date of Patent: Jul. 7, 1998

[54] PRODUCTION METHOD OF POLYCARBONATE

[75] Inventors: Katsushige Hayashi; Tsutomu Kawakami; Yuji Takeda; Katuhiro Iura, all of Ibaraki, Japan

[73] Assignee: Mitsubishi Gas Chemical Company, Inc., Tokyo, Japan

[21] Appl. No.: 615,466

[22] Filed: Mar. 14, 1996

[30] Foreign Application Priority Data

Mar. 22, 1995 [JP] Japan ................................. 7-062994
Mar. 22, 1995 [JP] Japan ................................. 7-062995

[51] Int. Cl.$^6$ ................................................. C08G 64/00
[52] U.S. Cl. .................. 528/196; 264/176.1; 264/211.24; 264/219; 528/198; 528/199; 528/481; 528/501
[58] Field of Search ........................... 264/176.1, 211.24, 264/219; 528/196, 198, 199, 481, 501

[56] References Cited

U.S. PATENT DOCUMENTS 4,627,949  12/1986  Dhein et al. ........................... 264/101
4,952,672   8/1990  Moore et al. ......................... 528/481
4,954,303   9/1990  Moore et al. ......................... 264/101

Primary Examiner—Terressa Mosley
Attorney, Agent, or Firm—Sughrue, Mion, Zinn, Macpeak & Seas, PLLC

[57] ABSTRACT

A method of producing a polycarbonate excellent in the hue, the thermal stability, and the electrolysis stability by supplying a polycarbonate obtained by a transesterification method to an extruder having vent(s), melting the polycarbonate, and adding an acidic compound to the molten polycarbonate followed by kneading to continuously devolatilize low molecular weight compounds remaining in the polycarbonate. Better result is obtained by adding water to the kneaded mixture of the polycarbonate and the acidic compound before devolatilizing the low molecular weight compounds.

15 Claims, No Drawings

PRODUCTION METHOD OF POLYCARBONATE

FIELD OF THE INVENTION

The present invention relates to a method of producing a polycarbonate by a so-called transesterification method. More specifically, the invention relates to a method of producing polycarbonate excellent in the hue, the thermal stability, and the hydrolysis stability.

BACKGROUND OF THE INVENTION

A so-called transesterification method of producing a polycarbonate by polycondensing a carbonic acid diester and a hydroxyaryl compound has recently been reviewed from the points that not only the production step is relatively simple as compared with a phosgene method (interfacial polymerization method) and the transesterification method can have the superiority in the operation and the cost, but also a halogen solvent such as phosgene, methylene chloride, etc., having a strong toxicity is not used. However, the transesterification method has yet less employed as an industrial process at present.

The reason is that the polycarbonate produced by a conventional transesterification method has some disadvantages in the point of quality and, in particular, the inferiorities of the polycarbonate in the hue, the thermal stability, and the hydrolysis stability become large problems.

Various investigations have hitherto been made to overcome the problems. For example, there are the improvement of catalysts as described in JP-A-55-142025, JP-A-2-124934, and JP-A-2-212518 (the term "JP-A" as used herein means an "unexamined published Japanese patent application"), the investigations of the materials for the reactors and the surface treatment as described in U.S. Pat. No. 4,383,092, JP-A-4-7328, and JP-A-4-72327, the investigations of the polymerization process and the polymerization apparatus as described in JP-A-61-62522 and JP-A-2-153923, the investigation of terminal blocking as described in JP-A-63-43924 and JP-A-2-175723, the investigations of stabilizers as described in JP-A-4-15223, JP-A-4-36344, and JP-A-4-41525, etc.

However, even when the above methods are applied, it has yet been difficult to obtain a polycarbonate sufficiently excellent in the hue, the thermal stability, and the hydrolysis stability.

SUMMARY OF THE INVENTION

Accordingly, an object of the present invention is to overcome the problems in the quality of the polycarbonate obtained by a transesterification method and to provide a method of producing a polycarbonate having the improved hue, thermal stability, and hydrolysis stability.

As a result of various investigations to overcome these problems described above, it has been found that the presence of low molecular weight compounds such as raw material monomers, hydroxy compounds by-produced, catalysts, oligomers, etc., remaining in the polycarbonate resin obtained by the transesterification method is the large cause of deteriorating the hue, the thermal stability, and the hydrolysis stability of the polycarbonate. The present invention has been completed based on this finding.

According to one embodiment of the present invention, there is provided a method of producing a polycarbonate, which comprises supplying a polycarbonate obtained by a polycondensation reaction of a carbonic acid diester and a dihydroxyaryl compound in the presence of a transesterification catalyst to an extruder having at least one vent, melting the polycarbonate, adding an acidic compound to the molten resin before the vent nearest the resin inlet (hopper) of the extruder to continuously devolatilize low molecular weight compounds remaining in the resin.

According to another embodiment of the present invention, there is provided a method of producing a polycarbonate, which comprises supplying a polycarbonate obtained by a polycondensation reaction of a carbonic acid diester and a dihydroxyaryl compound to an extruder having at least one vent, melting the polycarbonate, adding an acidic compound to the molten resin before the vent nearest the resin inlet (hopper) of the extruder, kneading the resulting mixture, and adding water to the kneaded mixture to continuously devolatilize low molecular weight compounds remaining in the resin.

DETAILED DESCRIPTION OF THE INVENTION

The present invention is described in detail below.

The polycarbonate obtained in the present invention is one produced by a so-called transesterification method, and the carbonic acid diester which is one of the raw material monomers is represented by the following formula (1).

wherein A represents a monovalent substituted or unsubstituted aliphatic group having from 1 to 18 carbon atoms, or a monovalent substituted or unsubstituted aromatic group, and two As may be the same or different.

Examples of the carbonic acid diester represented by the above formula (1) include diphenyl carbonate, a substituted diphenyl carbonate, dimethyl carbonate, diethyl carbonate, ditolyl carbonate, and di-t-butyl carbonate. Of those compounds, diphenyl carbonate and a substituted diphenyl carbonate are particularly preferred. Those carbonic acid diesters may be used alone or as mixtures of two or more thereof.

A dicarboxylic acid or a dicarboxylic acid ester may be used together with the carbonic acid diester in an amount of 50 mole % or less, and preferably 30 mole % or less. Examples of such a dicarboxylic acid or a dicarboxylic acid ester which can be used include terephthalic acid, isophthalic acid, diphenyl terephthalate, and diphenyl isoplithalate. When such a carboxylic acid or a carboxylic acid ester is used together with the carbonic acid diester, a polyester carbonate is obtained.

The dihydroxyaryl compound which is another raw material monomer is represented by the following formula (2).

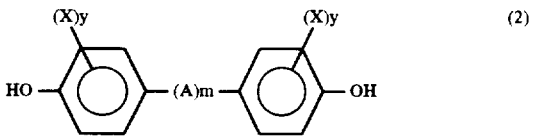

wherein A represents a divalent hydrocarbon group having from 1 to 15 carbon atoms, a halogen-substituted divalent hydrocarbon group, or other divalent group such as —S—, —S$_2$—, —SO$_2$—, —SO—, —O—, and —CO—; X represents a halogen atom, an alkyl group having from 1 to 14 carbon atoms, an aryl group having from 6 to 18 carbon atoms, an oxyalkyl group having from 1 to 8 carbon atoms, or an oxyaryl group having from 6 to 18 carbon atoms; m represents 0 or 1; and y represents an integer of from 0 to 4.

Examples of the dihydroxyaryl compound represented by the above formula (2) include 2,2-bis(4-hydroxyphenyl)propane |=bisphenol A|, 2,2-bis(4-hydroxy-3,5-dimethylphenyl)propane, 2,2-bis(4-hydroxy-3,5-diethylphenyl)propane, 2,2-bis|4-hydroxy-(3,5-diphenyl)phenyl|propane, 2,2-bis(4-hydroxy-3,5-dibromophenyl)propane, 2,2-bis(4-hydroxyphenyl)pentane, 2,4'-dihydroxydiphenylmethane, bis(4-hydroxyphenyl)methane, bis(4-hydroxy-5-nitrophenyl)methane,1,1-bis(4-hydroxyphenyl)ethane, 3,3-bis(4-hydroxyphenyl)pentane, 1,1-bis(4-hydroxyphenyl)-cyclohexane, bis(4-hydroxyphenyl)sulfone, 2,4'-dihydroxydiphenylsulfone, bis(4-hydroxyphenyl)diphenyldisulfone, bis(4-hydroxyphenyl)sulfide, 4,4'-dihydroxydiphenyl ether, 4,4'-dihydroxy-3,3'-dichlorodiphenyl ether, and 4,4'-dihydroxy-2,5-diethoxydiphenyl ether.

These dihydroxyaryl compounds may be used alone or as a mixture thereof, and if necessary they can be used as copolymers thereof.

In producing the polycarbonate by a transesterification method, a catalyst is usually used. In the production of polycarbonate by the method of the present invention, there is no particular restriction on the kind of the catalyst used, but basic compounds such as alkali metal compounds, alkaline earth metal compounds, basic boron compounds, basic phosphorus compounds, basic ammonium compounds, and amine compounds are generally used. These compounds may be used alone or as a combination of them.

The amount of the catalyst used is usually in the range of from $1\times10^{-9}$ to $1\times10^{-3}$ mole, and preferably from $1\times10^{-7}$ to $1\times10^{-5}$ mole, per mole of the dihydroxyaryl compound.

Examples of the alkali metal compounds include sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium borophenylate, sodium benzoate, potassium benzoate, lithium benzoate, disodium hydrogenphosphate, dipotassium hydrogenphosphate, dilithium hydrogenphosphate, disodium phenylphosphate, dipotassium phenylphosphate, dilithium phenylphosphate, a disodium salt of bisphenol A, a dipotassium salt of bisphenol A, a dilithium salt of bisphenol A, a sodium salt of phenol, a potassium salt of phenol, and a lithium salt of phenol.

Examples of the alkaline earth metal compounds include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, magnesium carbonate, barium carbonate, strontium carbonate, calcium acetate, barium acetate, magnesium acetate, strontium acetate, calcium stearate, magnesium stearate, barium stearate, and strontium stearate.

Examples of the basic boron compounds include hydroxides, sodium salts, potassium salts, lithium salts, calcium salts, magnesium salts, barium salts, or strontium salts of tetramethylboron, tetraethylboron, tetrapropylboron, tetrabutylboron, trimethylethylboron, trimethylbenzylboron, triethylmethylboron, triethylbenzylboron, triethylphenylboron, tributylbenzylboron, tributylphenyLboron, tetraphenylboron, benzyltriphenylboron, methyltriphenylboron, and butyltriphenylboron.

Examples of the basic phosphorus compounds include triethylphosphine, tri-n-propylphosphine, triisopropylphosphine, tri-n-butylphosphine, triphenylphopshine, tributylphosphine, and a quaternary phosphonium salt.

Examples of the basic ammonium compounds include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine series compounds include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline.

Of those catalysts, the use of the alkali metal compounds or the alkaline earth metal compounds is inexpensive and preferable.

A transesterification reaction is generally conducted by multi-stage steps of 2 stage steps or more. Practically, the 1st stage reaction is carried out at a temperature of from 120° C. to 260° C., and preferably from 180° C. to 240° C., for from 0.1 to 5 hours, and preferably from 0.5 to 3 hours under atmospheric pressure or reduced pressure. The reaction temperature is increased while decreasing the pressure of the reaction system, and finally the polycondensation reaction is carried out at a temperature of from 240° C. to 320° C. under reduced pressure of 1 mm Hg or lower.

Examples of the reaction system which can be employed include a batch system, a continuous system, and a combination of a batch system and a continuous system. Further, the reaction apparatus used can be any system of a bath type, a cylinder type, or a tower type.

The polycarbonate resin used in the present invention has a viscosity average molecular weight (Mv) of from 10,000 to 100,000, and preferably from 12,000 to 40,000.

In the polycarbonate produced by the polycondensation reaction method, low molecular weight compounds such as raw material monomers, catalysts, hydroxy compounds by-produced by the transesterification reaction, polycarbonate oligomers, etc., remain. In these low molecular weight compounds, the remaining amounts of the raw material monomers and the by-produced hydroxy compounds are large and they give bad influences on the properties of the polycarbonate resin.

As a method of removing the low molecular weight compounds remaining in the polycarbonate resin, the present invention can employ a method of continuously devolatilizing these compounds by a bent-type extruder. In this case, the basic transesterification catalyst remaining in the resin is previously neutralized with an acidic compound to inactivate the same, whereby the occurrence of a side reaction during devolatilization is efficiently restrained and the raw molecular weight compounds such as the raw material monomers and the hydroxy compounds can be removed.

There is no particular restriction on the acidic compound added in the present invention, and any acidic compound having an effect of neutralizing the basic transesterification catalyst used for the polycondensation reaction can be used Specific examples of the acidic compounds are Brønsted acids such as hydrochloric acid, nitric acid, boric acid, sulfuric acid, sulfurous acid, phosphoric acid, phosphorous acid, hypophosphorous acid, polyphosphoric acid, adipic acid, ascorbic acid, aspartic acid, azelaic acid, adenosine phosphoric acid, benzoic acid, formic acid, valeric acid, citric acid, glycolic acid, glutamic acid, glutaric acid, cinnamic acid, succinic acid, acetic acid, tartaric acid, oxalic acid, p-toluenesulfinic acid, p-toluenesulfonic acid, alkyl-p-toluenesulfonic acid, alkylene-p-toluenesulfonic acid, naphthalenesulfonic acid, nicotinic acid, picric acid, picolinic acid, phthalic acid, propionic acid, benzenesulfinic acid, benzenesulfonic acid, malonic acid, maleic acid, etc., and the esters of these acids. Of these acidic compounds, boric acid, phosphoric acid, phosphorous acid, hypophosphorous acid, polyphosphoric acid, p-toluenesulfoinic acid, alkyl-p-toluenesulfonic acid, alkylene-p-toluenesulfonic acid, naphthalenesulfoonic acid, benzenesulfonic acid are preferably used from the points that those are easily handled and are inexpensive.

These acidic compounds may be added alone or as a combination of them, and the addition amount thereof is in the range of from 0.1 to 50 mole times, and preferably from 0.5 to 30 mole times, the amount of neutralizing the basic transesterification catalyst used for the polycondensation reaction.

The addition period of the acidic compound may be any period if the acidic compound is added before the introduction of water and the devolatilization operation, and there is also no particular restriction on the addition method of the acidic compound. The efficient method of adding the acidic compound is a method of using an extruder equipped with an inlet for the acidic compound and a kneading portion of the acidic compound and the resin before the vent portion of the extruder, that is, the resin supplying inlet side, and continuously adding the acidic compound to neutralize and inactivate the catalyst in the resin.

There is no restriction on the addition manner of the acidic compound, and a method of directly adding the acidic compound, a method of adding as a solution thereof dissolved in a proper solvent, a method of adding as the masterbatch pellets of the acidic compound, etc., can be used according to the properties of the acidic compound used and the desired condition.

The extruder used in the present invention may be any types if the extruder has at least one vent portion.

Practically, there is a vent-type single screw or multi-screw extruder, and in particular, an intermeshing twin screw extruder is preferably used, wherein the rotation direction of twin screws may be a co-rotating direction or counter-rotating direction. There is no particular restriction on the number of vents, but usually multi-stage vents of from 2 stage bents to 10 stage bents are used. When the extruder having multistage vents is used, the acidic compound is added before the vent portion (the 1st vent) nearest the resin supplying inlet (hopper).

In the another embodiment of the present invention, water is introduced after adding the acidic compound to the resin, and kneading the resulting mixture. It is necessary that water is introduced into the extruder before the vent to well mix with and disperse in the resin, and the low molecular weight compounds are continuously devolatilized from the vent(s). In this case, since the distance from the inlet of water to the vent nearest the inlet of water changes according the form of the screw and the rotation speed of the screw, it is desirable that the distance is actually determined previously by experiment. Further, it is effective and preferable that according to the number of the vents, the introduction of water is carried out by two or more stages.

The amount of water introduced has no relationship with the number of the introducing stages, and water is continuously introduced into the extruder in an amount of from 0.1 to 10% by weight, and preferably from 0.3 to 5% by weight, based on the weight of the extruding resin per one stage. If the amount of water introduced is too small, a sufficient devolatilization effect is not obtained, while if the amount is too large, it becomes a cause that hydrolysis of the resin occurs, which are undesirable.

There is no particular restriction on the water used, but water having less dissolved oxygen is preferred.

The temperature of the resin at the devolatilizing extrusion treatment is from 250° C. to 350° C., and preferably from 270° C. to 330° C., and the pressure is 200 mm Hg or less, and preferably 50 mm Hg or less. The rotation number of the screw of the extruder is from 50 to 500 rpm, and preferably from 100 to 300 rpm.

Regarding the period of devolatilizing the low molecular weight compounds in the resin by the method of the present invention, it is generally proper to carry out the devolatilization after completion of the polymerization reaction. The method of supplying the resin to the devolatilization treatment by the extruder, which can be employed includes a method of introducing the resin in a molten state immediately after the polymerization into the extruder for the treatment, and a method of once solidifying the resin after cooling, and then introducing the solidified resin into the extruder for the treatment. Further, if necessary, additives such as a stabilizer, an ultraviolet absorber, a mold releasing agent, a coloring agent, etc., can be added to the resin followed by kneading with the resin, using the above extruder.

The present invention is explained in more detail by the following examples, but the invention is not limited by these examples.

The determination of the low molecular weight compounds (diphenyl carbonate, bisphenol A, and phenol) remaining in the resin and the evaluation of the properties of each polycarbonate resin were carried out by the following methods.

(1) Determination of Residual Low Molecular Weight Compounds

A weighed amount of a polycarbonate sample was dissolved in methylene chloride, and acetone was then gradually added to the solution with stirring to reprecipitate the resin. After sufficiently stirring the system, the precipitates formed were removed by filtration. After evaporating to dryness the filtrate by an evaporator, the dried matters were re-dissolved in chloroform and the compounds dissolved were determined by GPC using tert-butylphenol as the internal standard.

(2) Evaluation of Thermal Stability

After drying 4 g of a polycarbonate sample at 120° C. for 2 hours in a nitrogen gas atmosphere, the sample was melted in an aluminum block bath at 360° C. for one hour in a nitrogen gas atmosphere. After cooling, the sample was dissolved in 25 ml of methylene chloride and the YI value was measured by an automatic analyzer (MODEL; TC-1800MK II, manufactured by Tokyo Denshoku K.K.). (The smaller the value is, the better the hue is.)

(3) Evaluation of Hydrolysis Stability

A 3 mm thick injection molded product was prepared and after allowing to stand the product in a pressure cooker (manufactured by Alp K.K.) under the conditions of steam of 120° C. for 100 hours, the change of the haze value of the molded product was measured by a haze meter (MODEL; 1001 DP, Nippon Denshoku K.K.). (The smaller the value is, the better the transparency is.)

(4) Molecular Weight

The intrinsic viscosity $|\eta|$ of the sample in methylene chloride at 20° C. was measured using a Ubbelohde's viscometer and the molecular weight was calculated by the following equation.

$$|\eta|=1.11 \times 10^{-4} \times (Mv)^{0.83}$$

EXAMPLES 1 TO 10 AND COMPARATIVE EXAMPLE 1

In a reaction vessel (made of SUS 310 S, effective capacity 50 liters) equipped with a stirrer were charged 11.03 kg (51.5 moles) of diphenyl carbonate, 11.42 kg (50.0 moles), and $8.0 \times 10^{-5}$ mole of disodium phenylphosphate and after dissolving the raw material monomers at 180° C. over a period of 40 minutes in a nitrogen gas atmosphere, polymerization reaction was carried out under the conditions of 210° C. and 760 mm Hg for 1 hour, 210° C. and 100 mm Hg for 1 hour, 240° C. and 15 mm Hg for 1 hour, and then 280° C. and 0.5 mm Hg for 1 hour. After completion of the reaction, the polymer formed was taken out from the reaction vessel and pelletized by a pelletizer.

By repeating the batch reaction 20 times under the same conditions, total about 200 kg of a polycarbonate resin was produced. The average molecular weight Mv of the polymer obtained was 16,200 at the minimum and 16,800 at the maximum, and Mv after blending well the polymers of the 20 batches was 16,600. Also, as a result of analyzing the low molecular weight compounds remaining in the polycarbonate, the amount of diphenyl carbonate was 462 ppm, the amount of bisphenol A was 118 ppm, and the amount of phenol was 162 ppm.

The polycarbonate thus obtained was subjected to a devolatilizing extrusion treatment using a twin screw extruder (diameter 46 mm, intermeshing screw type, co-rotation direction, manufactured by Kobe Steel, Ltd.) equipped with an inlet for an acidic compound before the vent (the 1st vent) nearest the resin supplying inlet and a kneading portion under the conditions shown in Table 1(1), and the polycarbonate was recovered again as the pellets. In addition, the acidic compound was continuously introduced by a quantitative side feeder using master batch pellets.

The concentrations of the low molecular weight compounds remaining in each resin after the devolatilizing extrusion treatment and the evaluation results of various properties of each resin are shown in Table 1(2) below.

TABLE 1 (1)

| | | | Volatilization Extrusion Condition | | | |
|---|---|---|---|---|---|---|
| Acidic Compound | | | (A) | (B) | (C) | (D) |
| Compound | Amount* | | (kg/hr) | (°C.) | (mmHg) | (rpm) |
| Ex. 1 | PA | 2.0 | 60 | 290 | 3to5 | 200 |
| Ex. 2 | PA | 5.0 | 60 | 290 | 3to5 | 200 |
| Ex. 3 | PA | 10.0 | 60 | 290 | 3to5 | 200 |
| Ex. 4 | H₂PHO₃ | 10.0 | 60 | 290 | 3to5 | 200 |
| Ex. 5 | BA | 10.0 | 60 | 290 | 3to5 | 200 |
| Ex. 6 | p-TSA | 10.0 | 60 | 290 | 3to5 | 200 |
| Ex. 7 | p-TSB | 10.0 | 60 | 290 | 3to5 | 200 |
| Ex. 8 | p-TSB | 20.0 | 60 | 290 | 3to5 | 200 |
| Ex. 9 | p-TSE | 10.0 | 60 | 290 | 3to5 | 200 |

TABLE 1 (1)-continued

| | | | Volatilization Extrusion Condition | | | |
|---|---|---|---|---|---|---|
| Acidic Compound | | | (A) | (B) | (C) | (D) |
| Compound | Amount* | | (kg/hr) | (°C.) | (mmHg) | (rpm) |
| Ex. 10 | BSA | 10.0 | 60 | 290 | 3to5 | 200 |
| C. Ex. 1 | none | — | 60 | 290 | 3to5 | 200 |

In the above table:
(*): mole/mole-catalyst
(A): Extruded Amount
(B): Temperature
(C): Pressure
(D): Rotation Number
(Ex.): Example
(C. Ex.): Comparative Example
(PA): Phosphoric Acid
(BA): Boric Acid
(p-TSA): p-Toluenesulfonic Acid
(p-TSB): n-Butyl p-Toluenesulfonate
(p-TSE): Ethylene p-Toluenesulfonate
(BSA): Benzenesulfonic Acid

TABLE 1 (2)

| | Residual Amount of Low-Molecular Weight Compounds | | | Evaluation of Properties | |
|---|---|---|---|---|---|
| | DPC (ppm) | BPA (ppm) | Phenol (ppm) | Thermal Stability YI value | Hydrolysis Stability Haze value |
| Ex. 1 | 165 | 60 | 52 | 2.2 | 19.8 |
| Ex. 2 | 113 | 55 | 40 | 2.2 | 20.7 |
| Ex. 3 | 92 | 49 | 39 | 1.9 | 20.8 |
| Ex. 4 | 123 | 60 | 48 | 2.8 | 20.0 |
| Ex. 5 | 122 | 58 | 45 | 2.9 | 21.2 |
| Ex. 6 | 104 | 56 | 40 | 1.8 | 18.0 |
| Ex. 7 | 88 | 48 | 35 | 1.8 | 16.7 |
| Ex. 8 | 78 | 44 | 31 | 1.5 | 16.5 |
| Ex. 9 | 92 | 53 | 35 | 1.8 | 16.8 |
| Ex. 10 | 95 | 55 | 30 | 1.7 | 17.0 |
| C. Ex. 1 | 397 | 78 | 80 | 5.9 | 35.3 |

DPC: Diphenyl Carbonate
BPA: Bisphenol A
Ex.: Example
C. Ex.: Comparative Example

EXAMPLES 11 TO 18 AND COMPARATIVE EXAMPLES 2 TO 5

In a reaction vessel (made of SUS 310 S, effective capacity 50 liters) equipped with a stirrer were charged 11.03 kg (51.5 moles) of diphenyl carbonate, 11.42 kg (50.0 moles) of bisphenol A, and $8.0 \times 10^{-5}$ mole of disodium phenylphosphate and after dissolving the raw material monomers at 180° C. over a period of 40 minutes in a nitrogen gas atmosphere, the polymerization reaction was carried out under the conditions of 210° C. and 760 mm Hg for 1 hour, 210° C. and 100 mm Hg for 1 hour, 240° C. and 15 mm Hg for 1 hour, and 280° C. and 0.5 mm Hg for 1 hour. After completion of the reaction, the polymer formed was taken out from the reaction vessel and pelletized by a pelletizer.

By repeating the batch reaction 20 times under the same conditions, total about 200 kg of a polycarbonate resin was produced. The average molecular weight Mv of the polymer obtained was 16,200 at the minimum and 16,800 at the maximum, and Mv after blending well the polymers of the 20 batches was 16,600. Also, the amount of diphenyl carbonate was 462 ppm, the amount of bisphenol A was 118 ppm, and the amount of phenol was 162 ppm.

The polycarbonate obtained was subjected to a devolatilizing extrusion treatment using a twin screw extruder (diameter 46 mm, intermeshing screw type, co-rotation direction, manufactured by Kobe Steel, Ltd.) equipped with an inlet for an acidic compound before the vent (the 1st vent) nearest the resin supplying inlet, a kneading portion, and a water introducing inlet, under the conditions shown in Table 2(1), and the polycarbonate was recovered again as the pellets. In addition, the acidic compound was continuously introduced by a quantitative side feeder using master batch pellets.

The concentrations of the low molecular weight compounds remaining in each resin after the devolatilizing extrusion treatment and the evaluation results of various properties of each resin are shown in Table 2(2) below.

TABLE 2 (1)

| | Acidic Compound | | Water Addition Condition | | Extrusion Condition | |
|---|---|---|---|---|---|---|
| | Compound | A-mount* | wt %/ stage | Water Addition Stage Number | Number of Vent | Extruded Amount (kg/hr.) |
| Ex. 11 | BSA | 10.0 | 1.0 | 3 | 4 | 60 |
| Ex. 12 | BSA | 10.0 | 2.0 | 3 | 4 | 60 |
| Ex. 13 | BSA | 10.0 | 1.0 | 2 | 4 | 60 |
| Ex. 14 | BSA | 3.3 | 1.0 | 3 | 4 | 60 |
| Ex. 15 | BSA | 10.0 | 1.0 | 2 | 2 | 60 |
| Ex. 16 | BSA | 10.0 | 1.0 | 3 | 4 | 40 |
| Ex. 17 | p-TSB | 10.0 | 1.0 | 3 | 4 | 60 |
| Ex. 18 | p-TSB | 10.0 | 1.0 | 3 | 4 | 60 |
| C. Ex. 2 | — | — | — | — | 4 | 60 |
| C. Ex. 3 | BSA | 10.0 | — | — | 4 | 60 |
| C. Ex. 4 | — | — | 1.0 | 3 | 4 | 60 |

(*): mole/mole-catalyst
(Ex.): Example
(C. Ex.): Comparative Example
(BSA): Benzenesulfonic Acid
(p-TSB): n-Butyl p-Toluenesulfonate
(p-TSE): Ethylene p-Toluenesulfonate Common Conditions Resin Temperature: 290° C.
Devolatilizing Pressure: 3 to 6 mm Hg
Screw Rotation Number: 200 rpm

TABLE 1 (2)

| | Residual Amount of Low Molecular Weight Compounds | | | Evaluation of Properties | |
|---|---|---|---|---|---|
| | DPC ppm | BPA ppm | Phenol ppm | Thermal Stability YI value | Hydrolysis Stability Haze value |
| Ex. 11 | 52 | 33 | 20 | 1.5 | 10.4 |
| Ex. 12 | 48 | 28 | 20 | 1.5 | 10.6 |

TABLE 1 (2)-continued

| | Residual Amount of Low Molecular Weight Compounds | | | Evaluation of Properties | |
|---|---|---|---|---|---|
| | DPC ppm | BPA ppm | Phenol ppm | Thermal Stability YI value | Hydrolysis Stability Haze value |
| Ex. 13 | 60 | 44 | 25 | 1.5 | 12.8 |
| Ex. 14 | 55 | 40 | 22 | 1.5 | 11.5 |
| Ex. 15 | 72 | 58 | 34 | 2.1 | 17.3 |
| Ex. 16 | 48 | 29 | 18 | 1.4 | 10.0 |
| Ex. 17 | 44 | 25 | 13 | 1.3 | 10.0 |
| Ex. 18 | 48 | 26 | 18 | 1.4 | 10.2 |
| C. Ex. 2 | 397 | 78 | 80 | 5.9 | 35.3 |
| C. Ex. 3 | 95 | 55 | 30 | 1.7 | 17.0 |
| C. Ex. 4 | 61 | 45 | 28 | 2.1 | 15.8 |

DPC: Diphenyl Carbonate
BPA: Bisphenol A
Ex.: Example
C. Ex.: Comparative Example As described above, according to the method of the present invention, the low molecular weight compounds remaining in the polycarbonate resin formed can efficiently be removed, whereby the polycarbonate resin excellent in the hue, the thermal stabilization, and the electrolysis stability can be obtained.

While the invention has been described in detail and with reference to specific embodiments thereof, it will be apparent to one skilled in the art that various changes and modifications can be made therein without departing from the spirit and scope thereof.

What is claimed is:

1. A method of producing a polycarbonate, which comprises supplying a polycarbonate obtained by polycondensation reaction of a carbonic acid diester and a dihydroxyaryl compound in the presence of a transesterification catalyst to an extruder having at least one vent, melting the polycarbonate, and adding an acidic compound to the molten resin before the vent nearest the resin supplying inlet of said extruder to continuously devolatilize low molecular weight compounds remaining in the resin; wherein the acidic compound is at least one member selected from the group consisting of an inorganic acid, a carboxylic acid, sulfonic acid, sulfinic acid, a carboxylic acid ester, a sulfonic acid ester, and a sulfinic acid ester.

2. A method of producing a polycarbonate, which comprises supplying a polycarbonate obtained by polycondensation reaction of a carbonic acid diester and a dihydroxyaryl compound in the presence of a transesterification catalyst to an extruder having at least one vent, melting the polycarbonate, adding an acidic compound to the molten resin before the vent nearest the resin supplying inlet of said extruder, kneading the resulting mixture, and adding water to the mixture to continuously devolatilize low molecular weight compounds remaining in the resin.

3. The method of producing a polycarbonate as claimed in claim 1 or 2, wherein the transesterification catalyst is a basic compound.

4. The method of producing a polycarbonate as claimed in claim 1 or 2, wherein the transesterification catalyst is at least one member selected from the group consisting of an alkali metal compound, an alkaline earth metal compound, a basic boron compound, a basic phosphorus compound, a basic ammonium compound, and an amine compound.

5. The method of producing a polycarbonate as claimed in claim 1 or 2, wherein the acidic compound is at least one member selected from the group consisting of an inorganic acid, a carboxylic acid, sulfonic acid, sulfinic acid, a carboxylic acid ester, a sulfonic acid ester, and a sulfinic acid ester.

6. The method of producing a polycarbonate as claimed in claim 1 or 2, wherein the acidic compound is added in an amount of from 0.1 to 50 mole times the amount of neutralizing the transesterification catalyst.

7. The method of producing a polycarbonate as claimed in claim 2, wherein water is added in at least two stages.

8. The method of producing a polycarbonate as claimed in claim 2, wherein water is added in an amount of from 0.1 to 10% by weight based on the weight of the extruding resin, per one stage.

9. The method of producing a polycarbonate as claimed in claim 1 or 2, wherein the vent-type extruder is a twin screw intermeshing type extruder having multi-stage vents.

10. The method of producing a polycarbonate as claimed in claim 1 or 2, wherein the carbonic acid diester is a compound represented by the following formula (1):

wherein A represents a monovalent substituted or unsubstituted aliphatic group having from 1 to 8 carbon atoms, or a monovalent substituted or unsubstituted aromatic group; and said two As may be the same or different.

11. The method of producing a polycarbonate as claimed in claim 6, wherein the carbonic acid ester is at least one member selected from the group consisting of diphenyl carbonate, a substituted diphenyl carbonate, dimethyl carbonate, diethyl carbonate, ditolyl carbonate, and di-t-butyl carbonate.

12. The method of producing a polycarbonate as claimed in claim 1 or 2, wherein the dihydroxyaryl compound is a compound represented by the following formula (2):

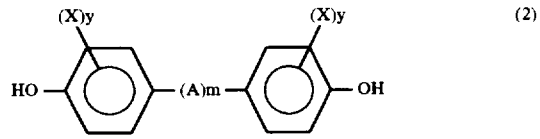

wherein A represents a divalent group selected from a divalent hydrocarbon group having from 1 to 15 carbon atoms, a halogen-substituted divalent hydrocarbon group, —S—, —S$_2$—, —SO$_2$—, —SO—, —O—, and —CO—; X represents a halogen atom, an alkyl group having from 1 to 14 carbon atoms, an aryl group having from 6 to 18 carbon atoms, an oxyalkyl group having from 1 to 8 carbon atoms, or an oxyaryl group having from 6 to 18 carbon atoms; m represents 0 or 1; and y represents an integer of from 0 to 4.

13. The method of producing a polycarbonate as claimed in claim 12, wherein the dihydroxyaryl compound is at least one member selected from the group consisting of 2,2-bis(4-hydroxyphenyl)propane, 2,2-bis(4-hydroxy-3,5-dimethylphenyl)-5propane, 2,2-bis(4-hydroxy-3,5-diehylphenyl)propane, 2,2-bis|4-hydroxy-3,5-diphenyl)phenyl|propane, 2,2-bis(4-hydroxy-3,5-dibromophenyl) propane, 2,2-bis(4-hydroxyphenyl)pentane, 4,4'-dihydroxydiphenylmethane, bis(4-hydroxyphenyl)methane, bis(4-hydroxy-5-nitrophenyl)methane, 1,1-bis(4-hydroxyphenyl) ethane, 3,3-bis(4-hydroxyphenyl)pentane, 1,1-bis(4-hydroxyphenyl)cyclohexane, bis(4-hydroxyphenyl)sulfone, 2,4'-dihydroxyphenylsulfone,bis(4-hydroxyphenyl) diphenyldisulfone, bis(4-hydroxyphenyl) sulfide, 4,4'-dihydroxy diphenyl ether, 4,4'-dihydroxy-3,3'-dichlorodiphenyl ether, and 4,4'-dihydroxy-2,5-diethoxydiphenyl ether.

14. The method of producing a polycarbonate as claimed in claim 1 or 2, wherein the carbonic acid diester is at least one member selected from the group consisting of diphenyl carbonate and a substituted diphenyl carbonate.

15. The method of producing a polycarbonate as claimed in claim 1 or 2, wherein the dihydroxyaryl compound is at least one member selected from the group consisting of 2,2-bis(4-hydroxyphenyl)propane, 2,2-bis(4-hydroxy-3,5-dimethylphenyl)-propane, 2,2-bis(4-hydroxy-3,5-diethylphenyl)propane, 2,2-bis|4-hydroxy-(3,5-diphenyl) phenyl|propane, 2,2-bis(4-hydroxyphenyl)cyclohexane, bis (4-hydroxyphenyl)sulfone, 4,4'-dihydroxydiphenyl ether, and 4,4'-dihydroxy-3,3'-dichlorodiphenyl ether.

* * * * *